United States Patent
Lee et al.

(10) Patent No.: US 8,233,845 B2
(45) Date of Patent: Jul. 31, 2012

(54) METHOD FOR MEASURING VARIABLE BANDWIDTH WIRELESS CHANNEL AND TRANSMITTER AND RECEIVER THEREFOR

(75) Inventors: Sung-Jun Lee, Gyeonggi-do (KR); Heon-Kook Kwon, Daejon (KR); Myung-Don Kim, Daejon (KR); Hyun-Kyu Chung, Daejon (KR); Kwang-Chun Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 13/344,029

(22) Filed: Jan. 5, 2012

(65) Prior Publication Data

US 2012/0100820 A1    Apr. 26, 2012

Related U.S. Application Data

(62) Division of application No. 11/951,522, filed on Dec. 6, 2007, now Pat. No. 8,112,040.

(30) Foreign Application Priority Data

Dec. 8, 2006    (KR) .................. 10-2006-0124918
Nov. 20, 2007    (KR) .................. 10-2007-0118559

(51) Int. Cl. *H04B 17/00* (2006.01)
(52) U.S. Cl. ............... 455/67.11; 455/115.1; 455/226.1; 375/329
(58) Field of Classification Search ............... 455/67.11, 455/115.1, 226.1, 266, 213; 375/329, 206, 375/200; 370/394, 514, 292
See application file for complete search history.

(56) References Cited

U.S. PATENT DOCUMENTS

| | | | | |
|---|---|---|---|---|
| 5,210,775 A | * | 5/1993 | Takahara et al. | 375/308 |
| 5,272,627 A | * | 12/1993 | Maschhoff et al. | 378/4 |
| 5,406,283 A | * | 4/1995 | Leung | 341/143 |
| 5,765,127 A | * | 6/1998 | Nishiguchi et al. | 704/208 |
| 5,920,589 A | * | 7/1999 | Rouquette et al. | 375/147 |
| 6,031,868 A | * | 2/2000 | Robertson et al. | 375/222 |
| 6,094,458 A | * | 7/2000 | Hellberg | 375/242 |
| 6,363,175 B1 | * | 3/2002 | Scheirer et al. | 382/232 |

(Continued)

FOREIGN PATENT DOCUMENTS

KR    1019990069000 B1    9/1999

(Continued)

OTHER PUBLICATIONS

Jarmo Kivinen, et al; "Wideband Radio Channel Measurement System at 2 GHz", IEEE Transactions on Instrumentation and Measurement, vol. 48, No. 1, Feb. 1999; pp. 39-44.

(Continued)

*Primary Examiner* — Minh D Dao
(74) *Attorney, Agent, or Firm* — Ladas & Parry LLP (57) ABSTRACT

Provided are a method for measuring a variable bandwidth wireless channel, and a transmitter and a receiver therefor. The transmitter, includes: a pre-processing unit for performing variable over-sampling and band-limited filtering on an original sequence for measuring the wireless channel according to a pre-determined digital-to-analog (D/A) operation speed and measurement bandwidth, and creating and storing a probing sequence whose frequency is up-converted into a fixed transmitting intermediate frequency; and a real-time processing unit for transmitting a probing signal that the stored probing sequence is converted according to the D/A operation speed to the wireless channel.

2 Claims, 9 Drawing Sheets

U.S. PATENT DOCUMENTS

| | | | |
|---|---|---|---|
| 6,459,743 B1 * | 10/2002 | Lipka | 375/329 |
| 6,522,871 B1 * | 2/2003 | Patrick et al. | 455/256 |
| 6,608,934 B2 * | 8/2003 | Scheirer et al. | 382/232 |
| 6,853,694 B1 | 2/2005 | Beaudin et al. | |
| 7,027,498 B2 * | 4/2006 | McCarty, Jr. | 375/232 |
| 2008/0012882 A1 * | 1/2008 | Koyanagi | 345/660 |

FOREIGN PATENT DOCUMENTS

| | | |
|---|---|---|
| KR | 20000012883 A | 3/2000 |
| KR | 1020050078636 A | 8/2005 |

OTHER PUBLICATIONS

USPTO RR mailed Mar. 17, 2011 in connection with U.S. Appl. No. 11/951,522.

USPTO NFOA mailed May 16, 2011 in connection with U.S. Appl. No. 11/951,522.

USPTO NOA mailed Oct. 5, 2011 in connection with U.S. Appl. No. 11/951,522.

* cited by examiner

METHOD FOR MEASURING VARIABLE BANDWIDTH WIRELESS CHANNEL AND TRANSMITTER AND RECEIVER THEREFOR

CROSS-REFERENCE(S) TO RELATED APPLICATIONS

The present invention claims priority of Korean Patent Application Nos. 10-2006-0124918 and 10-2007-0118559 filed on Dec. 8, 2006 and Nov. 20, 2007, respectively, which are incorporated herein by reference.

BACKGROUND OF THE INVENTION

1. Field of the Invention

The present invention relates to a method for measuring a variable bandwidth wireless channel, and a transmitter and a receiver therefor; and, more particularly, to a method for measuring variable bandwidth wireless channel by creating a variable bandwidth signal by fixing a digital-to-analog (D/A) operation speed and varying over-sampling according to a measurement bandwidth in a transmitting part, and acquiring a variable bandwidth signal by varying a receiving intermediate frequency and an analog-to-digital (A/D) operation speed according to a measurement bandwidth in a receiving part, and a transmitter and a receiver therefor.

This work was supported by the IT R&D program for MIC/IITA [2005-S-001-02, "Development of Wireless Spatial Channel Model for next generation mobile communication"].

2. Description of Related Art

Information of a wireless channel characteristic is required in developing a next generation mobile communication system. A wireless channel should be measured first in order to grasp a characteristic of a wireless channel.

Since a wireless channel of only a single bandwidth is measured in a conventional wireless channel measurement method, a plurality of wireless channel sounders are required to measure a wireless channel of a plurality of bandwidths. To be specific, the conventional wireless channel measurement method will be described as follows.

Figure 1:
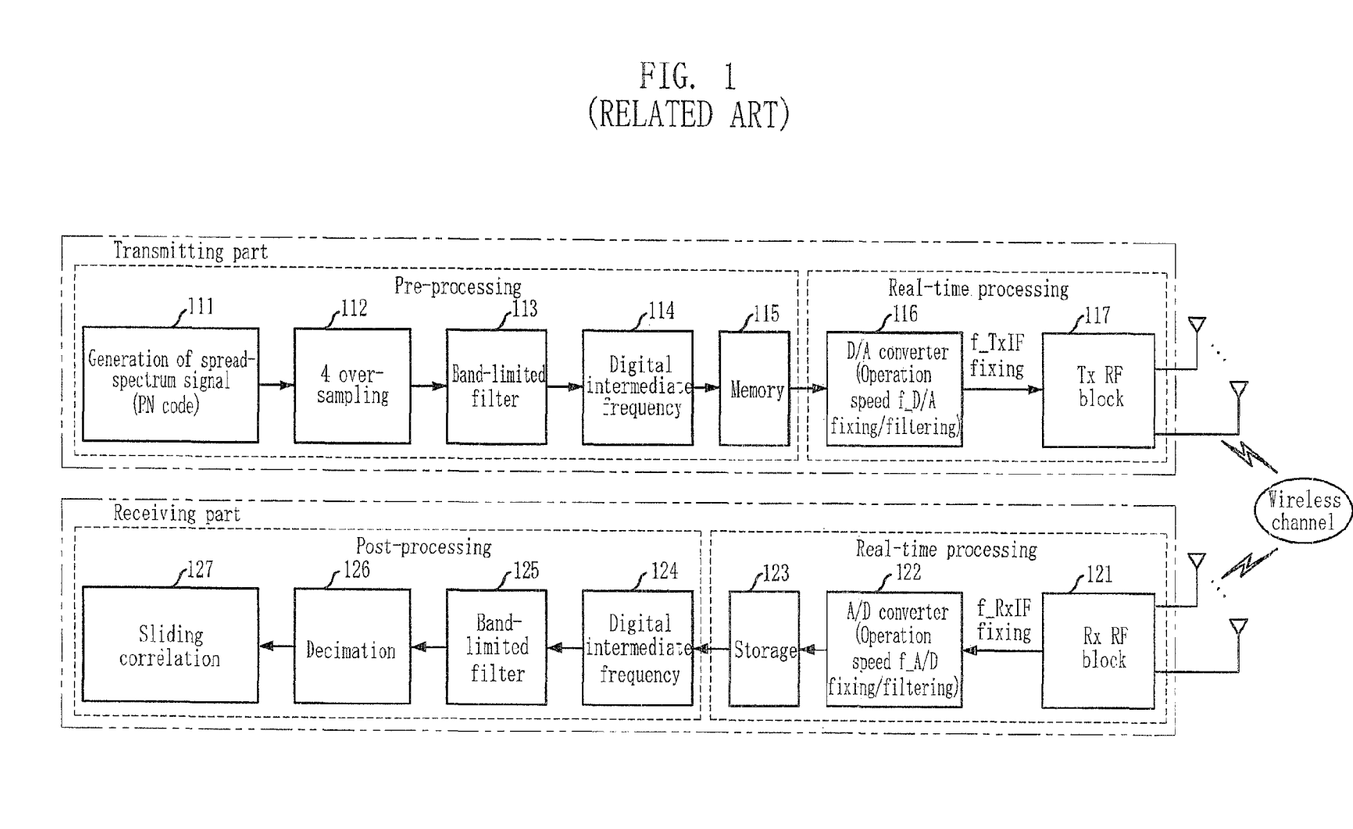
FIG. 1 is a block diagram showing a transmitter and a receiver of a conventional channel sounder measuring a single bandwidth wireless channel.

FIG. 1 is a block diagram showing a transmitter and a receiver of a conventional channel sounder measuring a single bandwidth wireless channel.

The transmitting part includes pre-processings 111 to 115 and realtime-processings 116 to 117. The transmitting part transmits a probing signal to a wireless channel. In the pre-processing of the transmitting part, a probing sequence is created and stored in a memory 115 inside transmitting part. Herein, the probing sequence means a sequence where fixed over-sampling, band-limitation, and up-conversion into a transmitting intermediate frequency based on a digital intermediate frequency method are performed on an original sequence for measurement.

Subsequently, when the wireless channel is measured, the transmitting part performs conversion and filtering on the probing sequence stored in the memory 115 into an analog signal according to a fixed D/A operation speed through a real-time process, and finally transmits the probing signal, on which the frequency up-conversion and filtering are performed, as a carrier frequency.

The receiving part includes real-time processings 121 to 123 and post-processings 124 to 127. The receiving part acquires and analyzes a probing signal passing the wireless channel.

When the wireless channel is measured, the receiving part performs frequency down-conversion on the signal received in real-time processing into a fixed receiving intermediate frequency, converts the signal into digital data according to a fixed A/D operation speed, and stores the digital data in a memory of an A/D converter in real-time. When a predetermined quantity of data is acquired, the receiving part stores the digital data stored in the memory of the A/D converter 122 in own storage 123. The A/D converter 122 stops an operation while the digital data are stored in the storage and restarts the operation on a probing signal received after the digital data are stored in the storage. After the wireless channel is measured, the receiving part analyzes the data stored in own storage 123 by acquiring signals a plurality of times in wireless channel measurement through post-processing, and checks a characteristic of a wireless channel.

In the conventional wireless channel measurement method, it is assumed that the digital intermediate frequency method of Digital IF, 114 and 124 is applied to the transmitting part and the receiving part and a 4 times over-sampling 112 is applied. The digital intermediate frequency method is assumed because a receiving signal may be distorted when an analog intermediate frequency (analog IF) method is used in the receiving part targeting exactly acquiring the probing signal passing the wireless channel. That is, when the analog intermediate frequency method is adopted in the receiving part, the receiving signal is converted into an In-phase signal (I signal) and a quadrature-phase signal (Q signal) of a baseband from an intermediate frequency band in a form of an analog signal, distortion may occur due to I/Q mismatch in the above procedure.

A reason that the 4 times over-sampling is assumed in the transmitting part is as follows. The 4 times over-sampling 112 and a band-limited filter 113 are required to adopt the digital intermediate frequency method in the transmitting part. The over-sampling should be performed more than 4 times in order to prevent aliasing in a spectrum with no regard to a characteristic of the band-limited filter 113 in the digital intermediate frequency method. That is, when the over-sampling is performed less than 4 times, aliasing may occur with no regard to a kind of transmitting intermediate frequency according to the band-limited filter characteristic. When the over-sampling is performed more than 4 times, the transmitting intermediate frequency which does not generate aliasing with no regard to the band-limited filter characteristic is widely selected. However, since over-sampling increases, a D/A operation speed needs to be fast.

Therefore, 4 times over-sampling is selected since unnecessary over-sampling is not required in the transmitting part. And, when over-sampling is 4 time, the transmitting intermediate frequency should be ¼ of the D/A operation speed (f_D/A) in order to prevent aliasing in a spectrum with no regard to the band-limited filter characteristic. In this case, there is a benefit that the operation quantity decreases.

$$(\text{Digital IF process}) = \text{Object sequence}(n) * \cos\left(2\pi f_{IF} \frac{n}{f_{D/A}}\right) \quad \text{Equation 1}$$

where when $$f_{IF} = \frac{f_{D/A}}{4}, \cos\left(2\pi f_{IF} \frac{n}{f_{D/A}}\right) = \cos\left(\frac{n\pi}{2}\right)$$

In Equation 1, when the transmitting intermediate frequency is ¼ of the D/A operation speed, $$\cos\left(\frac{n\pi}{2}\right)$$

is a repeat of [1,0,−1,0]. Accordingly, the operation quantity is small and the digital intermediate frequency method can be easily applied. In addition, the transmitting part may adopt the analog intermediate frequency method. However, in this case, the transmitting part also requires the over-sampling and the band-limited filter in order to decrease signal distortion due to the analog filter after D/A converter and the Sample And Hold (S/H) phenomenon of the D/A converter. Therefore, if the transmitting part requires the over-sampling and the band-limited filter all the time, it is good selection to adopt the digital intermediate frequency method as the receiving part does.

As described above, if 4 times over-sampling about the measurement bandwidth is adopted and the transmitting intermediate frequency is set at ¼ of the D/A operation speed, the transmitting intermediate frequency is set equally to the measurement bandwidth. A case that the measurement bandwidth is 100 MHz in the conventional single bandwidth wireless channel measurement transmitter and receiver is shown as follows.

TABLE 1

| | Transmitting part | | | Receiving part | | |
|---|---|---|---|---|---|---|
| Measurement bandwidth | Intermediate frequency (f_TxIF) | D/A operation speed (f_D/A) | Over-sampling | Intermediate frequency (f_RxIF) | A/D operation speed (f_A/D) | Decimation |
| 100 MHz | 100 MHz | 400 MHz | 4 | 100 MHz | 400 MHz | 4 |

As described above, since the case that the measurement bandwidth is fixed is considered in the conventional wireless channel measurement method, there is a problem that a plurality of wireless channel measurement transmitters and receivers are required in order to measure the wireless channel of a plurality of bandwidths.

SUMMARY OF THE INVENTION

The conventional technology has a problem about measuring a wireless channel of a variable bandwidth and an embodiment of the present invention is solving the problem.

An embodiment of the present invention is directed to providing a method for measuring a variable bandwidth wireless channel by creating a variable bandwidth signal by fixing a digital-to-analog (D/A) operation speed and varying over-sampling according to a measurement bandwidth in a transmitting part, and acquiring a variable bandwidth signal by varying a receiving intermediate frequency and an analog-to-digital (A/D) operation speed according to a measurement bandwidth in a receiving part, and a transmitter and receiver therefor.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a transmitter for measuring a wireless channel, including: a pre-processing unit for performing variable over-sampling and band-limited filtering on an original sequence for measuring the wireless channel according to a pre-determined digital-to-analog (D/A) operation speed and measurement bandwidth, and creating and storing a probing sequence whose frequency is up-converted into a fixed transmitting intermediate frequency; and a real-time processing unit for transmitting a probing signal that the stored probing sequence is converted according to the D/A operation speed to the wireless channel.

In accordance with another aspect of the present invention, there is provided a receiver for measuring a wireless channel, including: a real-time processing unit for storing measurement data acquired by varying a receiving intermediate frequency and an analog-to-digital (A/D) operation speed according to a measurement bandwidth; and a post-processing unit for checking a characteristic of the wireless channel from the measurement data.

In accordance with another aspect of the present invention, there is provided a method for measuring a wireless channel, including the steps of: performing variable over-sampling and band-limited filtering on an original sequence for measuring the wireless channel according to a pre-determined digital-to-analog (D/A) operation speed and measurement bandwidth, and creating and storing a probing sequence whose frequency is up-converted into a fixed transmitting intermediate frequency in a transmitting unit; and a real-time processing unit for transmitting a probing signal that the stored probing sequence is converted according to the D/A operation speed to the wireless channel in the transmitting unit.

In accordance with another aspect of the present invention, there is provided a method for measuring a wireless channel, including the steps of: storing measurement data acquired by varying a receiving intermediate frequency and an analog-to-digital (A/D) operation speed according to a measurement bandwidth; and checking a characteristic of the wireless channel from the measurement data in the receiving unit.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 2:
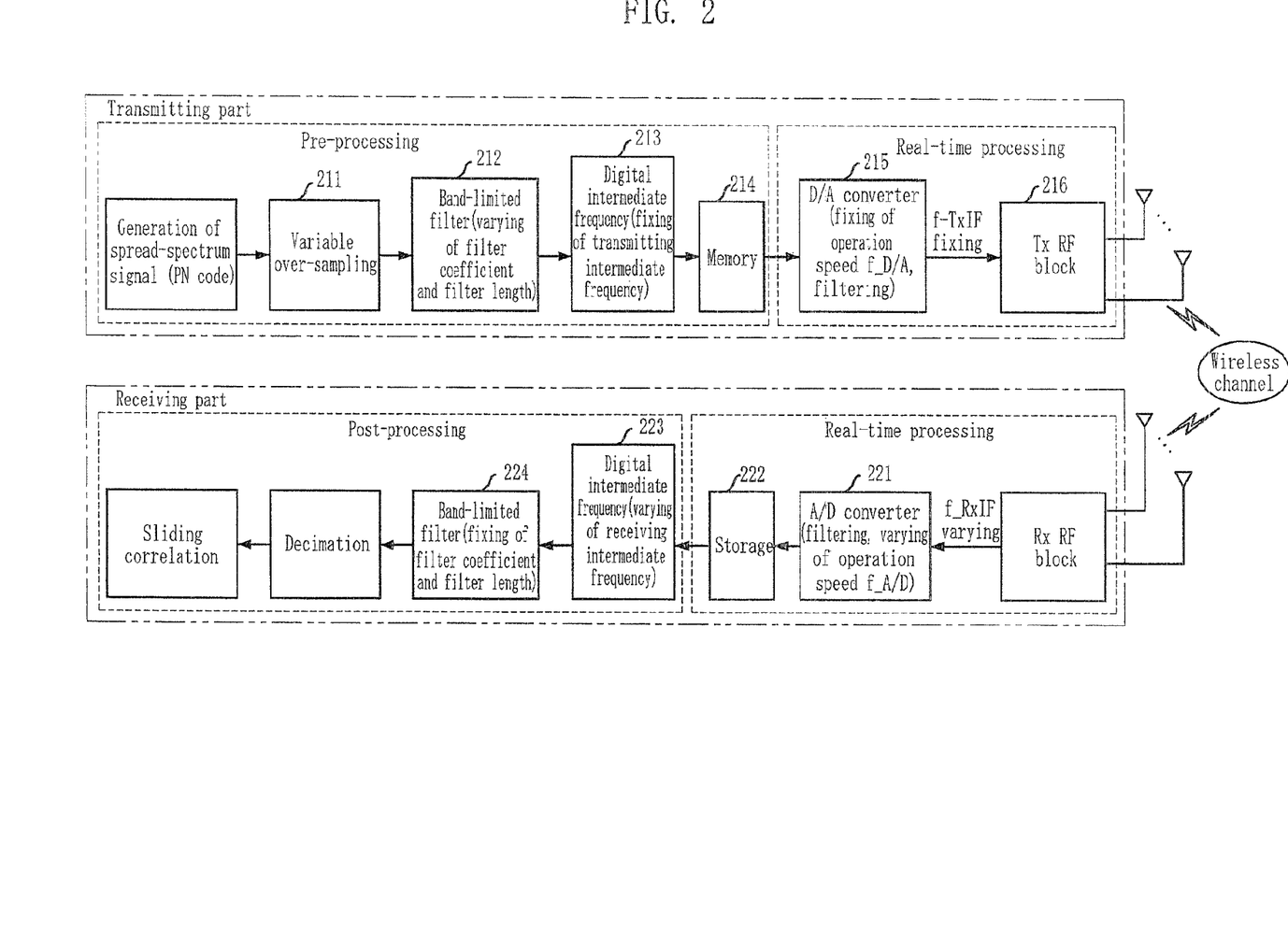
FIG. 2 is a block diagram showing a transmitter and a receiver for measuring a variable bandwidth wireless channel in accordance with an embodiment of the present invention.

FIG. 2 shows a transmitter and a receiver for measuring a variable bandwidth wireless channel in accordance with an embodiment of the present invention.

Referring to FIG. 2, although a case that a Pseudo Random Binary Sequence (PRBS) method using a pseudo noise (PN) code as an original sequence for measurement is applied is assumed, the transmitter and the receiver for measuring the variable bandwidth wireless channel, which is called "variable wireless channel measurement transmitter and receiver", is not limited to the PRBS method.

In FIG. 2, when bandwidths to be measured, i.e., measurement bandwidths, are 5 MHz, 10 MHz, 20 MHz, 40 MHz, and 100 MHz, a transmitting part and a receiving part operate as shown in Table 2. An operation of the case that the measurement bandwidth is 100 MHz in the variable wireless channel measurement transmitter and receiver of FIG. 2 is the same as the operation of the conventional single bandwidth wireless channel measurement transmitter and receiver of FIG. 1.

Therefore, the transmitting part has a benefit as follows. First, the transmitting part may create only one D/A clock. Second, since the transmitting part can use the same transmitting intermediate frequency with no regard to the bandwidth, the transmitting intermediate frequency filter is easily formed. Third, the transmitting part can easily remove the image element in frequency up-conversion from an intermediate frequency into a carrier frequency by relating the fixed transmitting intermediate frequency with the maximum measurement bandwidth among a plurality of bandwidths.

Differently from the present invention, when a variable bandwidth is realized by fixing over-sampling as 4, the D/A operation speed should be varied according to the measurement bandwidth. It means that the transmitting intermediate frequency is varied according to the measurement bandwidth. Accordingly, a filter bank is required to filter the transmitting intermediate frequency and a plurality of D/A clocks should be created for the D/A converter. Also, it causes a difficulty in removing an image.

In the real-time processing of the receiving part, a variable bandwidth signal is acquired by varying the receiving intermediate frequency of a digital intermediate frequency 224 and the A/D operation speed of the the A/D converter 221 according to the measurement bandwidth as shown in Table 2.

Referring to Table 2, the A/D operation speed satisfies "measurement bandwidth×4" and the receiving intermediate frequency is applied equally as the measurement bandwidth. For example, when the measurement bandwidth is 100 MHz, i.e., when the rate of the PN code for measurement is 100 MHz, the A/D operation speed should be 400 MHz. Since the receiving part performs A/D converting equally at a 4 times speed of the measurement bandwidth, the kinds of decimations are 4. The receiving part analyzes data by selecting one of (Make a selection among $1^{st}$, $5^{th}$, $9^{th}$, $13^{th}$ . . . ), (Make a

TABLE 2

| | Transmitting part | | | Receiving part | | |
|---|---|---|---|---|---|---|
| Measurement-bandwidth | Intermediate frequency (f_TxIF) | D/A operation speed (f_D/A) | Over-sampling | Intermediate frequency (f_RxIF) | A/D operation speed (f_A/D) | Number of kinds of decimation |
| 5 MHz | 100 MHz | 400 MHz | 80 | 5 MHz | 20 MHz | 4 |
| 10 MHz | | | 40 | 10 MHz | 40 MHz | 4 |
| 20 MHz | | | 20 | 20 MHz | 80 MHz | 4 |
| 40 MHz | | | 10 | 40 MHz | 160 MHz | 4 |
| 100 MHz | | | 4 | 100 MHz | 400 MHz | 4 |

In the pre-processing of the transmitting part, a variable over-sampling 211 varies according to the measurement bandwidth as shown in Table 2. That is, the transmitting part fixes the D/A operation speed of a D/A converter 215 and realizes a variable bandwidth by varying over-sampling according to the measurement bandwidth.

As shown in Table 2, the D/A operation speed satisfies measurement bandwidth×over-sampling. For example, when the measurement bandwidth is 100 MHz, i.e., when the rate of the PN code is 100 MHz, and the D/A operation speed is 400 MHz, the 4 times over-sampling should be applied.

The present invention fixes the D/A operation speed with no regard to the measurement bandwidth. Accordingly, the present invention can maintain the transmitting intermediate frequency at 100 MHz, which does not generate aliasing with no regard to the measurement bandwidth and the band-limited filter characteristic in a digital intermediate frequency 213 in the pre-processing of the transmitting part.

selection among $2^{nd}$, $6^{th}$, $10^{th}$, $14^{th}$ . . . ), (Make a selection among $3^{rd}$, $7^{th}$, $11^{th}$, $15^{th}$ . . . ), and (Make a selection among $4^{th}$, $8^{th}$, $12^{th}$, $16^{th}$ . . . ).

Accordingly, the receiving part has a benefit as follows. First, the receiving part may have a memory capacity of the A/D converter 221 for acquiring a probing signal once as a realistic value. Second, the receiving part may have a capacity of the storage 222 for storing a plurality of signal acquisitions as a realistic value. Third, the receiving part may fix an operation quantity of the band-limited filter 224 of the receiving part as a realistic value with no regard to the measurement bandwidth.

Figure 3:
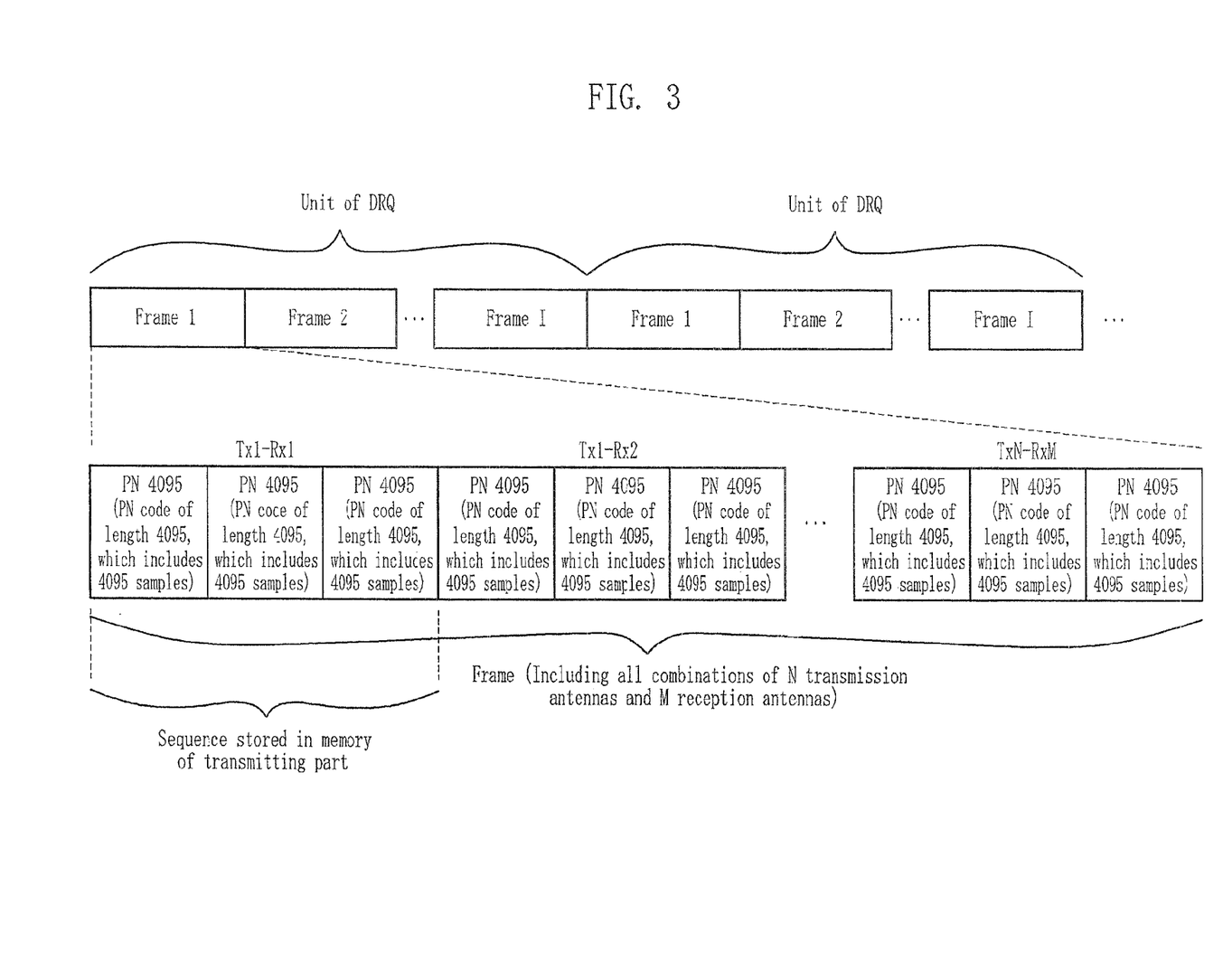
FIG. 3 shows an original sequence applied to the present invention.

FIG. 3 shows an original sequence for measurement applied to the present invention.

Referring to FIG. 3, the PN code applied to the present invention corresponds to a case that the number of code repetitions from one transmitting antenna into one receiving antenna is 3 and a length of a used spread-spectrum code is 4095, i.e., a length including 4095 samples, in M receiving antennas and N transmitting antennas.

In FIG. 3, the part expressed as "a sequence stored in the transmitting part memory" is an original sequence for measurement. A probing sequence is created when the original sequence passes the variable over-sampling procedure 211, the band-limited filter procedure 212, and the digital intermediate frequency procedure 213 in FIG. 2. The probing sequence is stored in the memory 214 of the actual transmitting part.

The transmitting part repeatedly emits the probing sequence. The receiving part stores one Data Acquisition (DAQ) unit in the memory of the A/D converter 221 of FIG. 2 and then stores the DAQ unit in the storage 222. While one DAQ unit is stored in the storage 222, the A/D converter 221 of the receiving part does not acquire the probing signal emitted by the transmitting part, but acquires one DAQ unit starting after end of a storing time. After the wireless channel is measured by repeating the above procedure, the measurement data acquired by a plurality of signal acquisitions are stored in the storage.

Figure 4A:
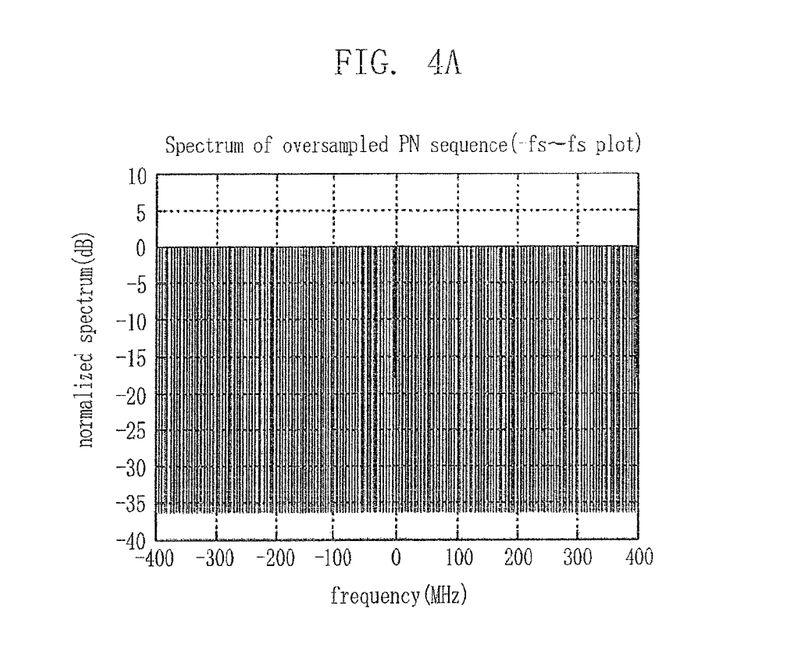
FIGS. 4A to 4C show an output spectrum of each part of pre-processings in the transmitting part when the original sequence of FIG. 3 is adopted and a measurement bandwidth is 5 MHz.
Figure 4B:
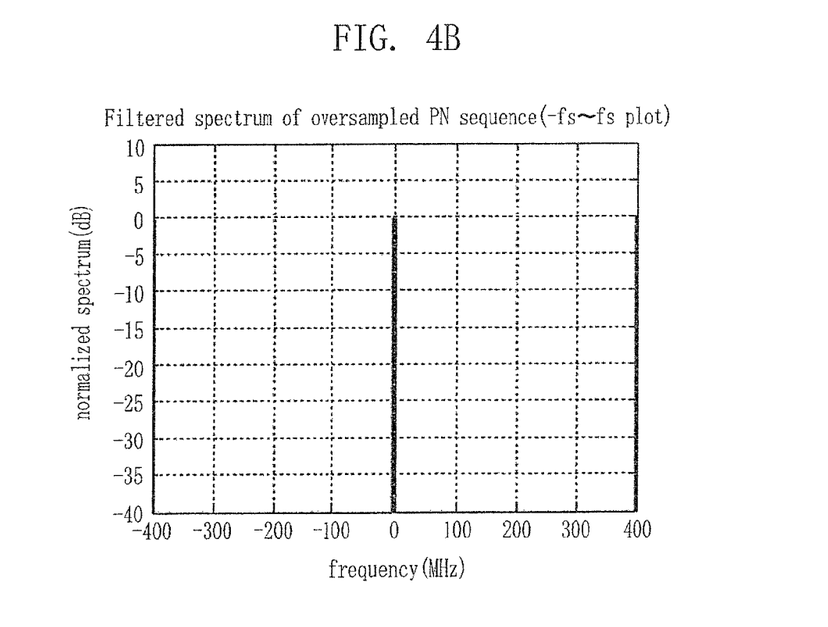
Figure 4C:
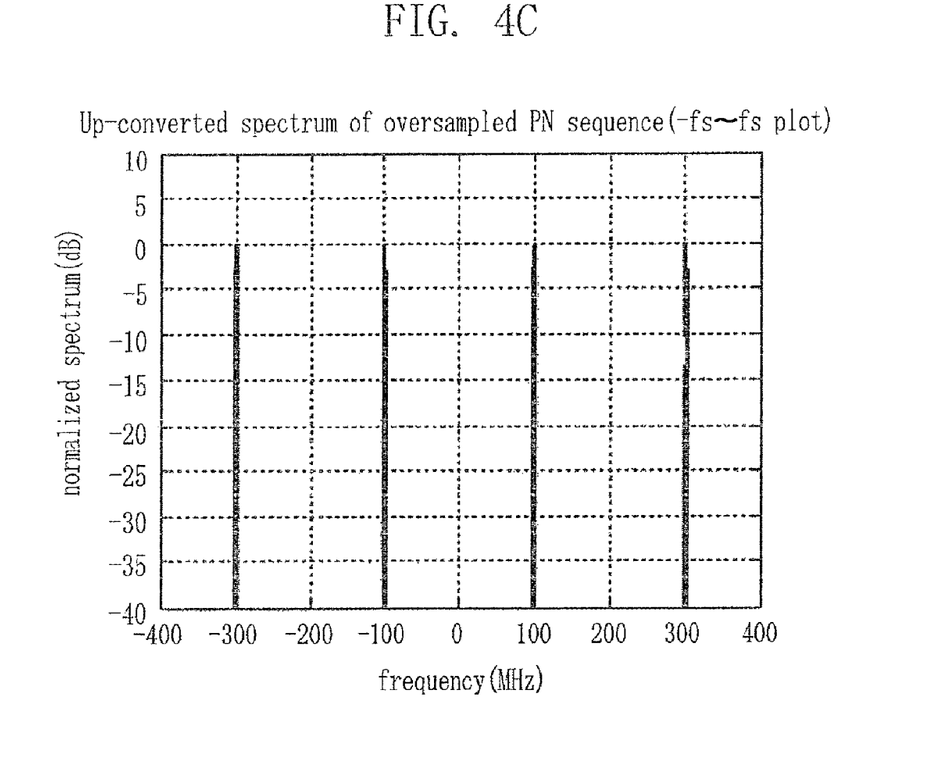

FIGS. 4A to 4C are graphs showing an output spectrum of each part in pre-processing of the transmitting part when the original sequence of FIG. 3 is used and the measurement bandwidth is 5 MHz. To be specific, FIGS. 4A to 4C show a case that a 80 times over-sampling is applied in the 5 MHz measurement bandwidth of Table 2. FIG. 4A shows an output spectrum of the variable over-sampling procedure 211 in the transmitting part and FIG. 4B shows an output spectrum of the band-limited filter procedure 212 in the transmitting part. FIG. 4C shows an output spectrum of the digital intermediate frequency procedure 213 in the transmitting part.

Figure 5A:
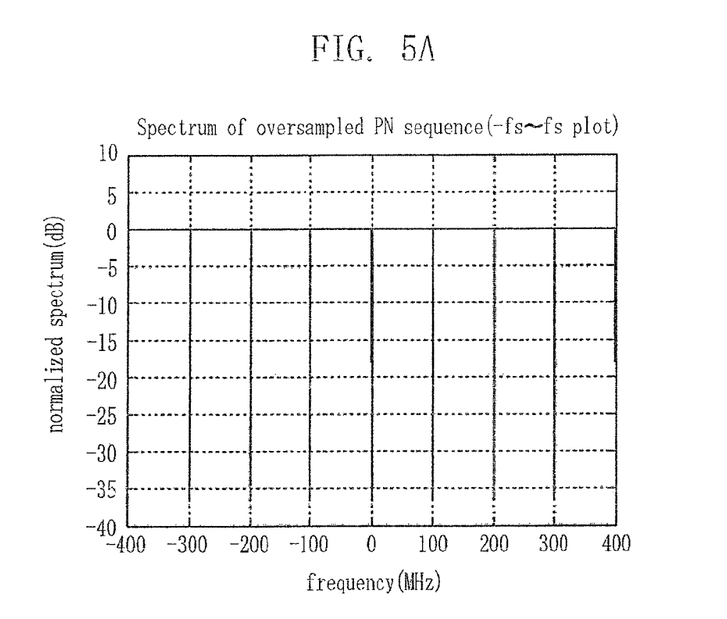
FIGS. 5A to 5C show an output spectrum of each part of pre-processings in the transmitting part when the original sequence of FIG. 3 is adopted and a measurement bandwidth is 100 MHz.
Figure 5B:
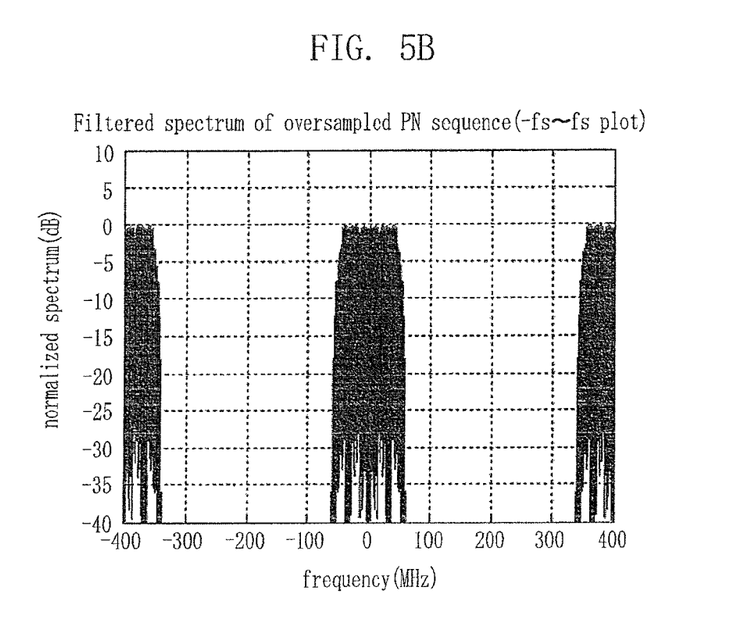
Figure 5C:
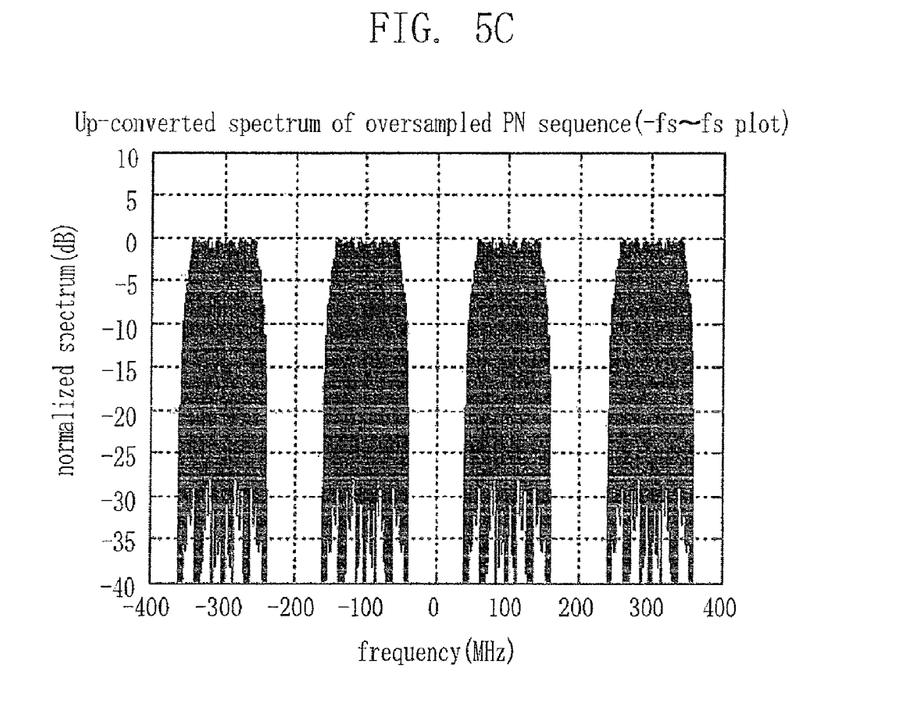

In the same manner, FIGS. 5A to 5C are graphs showing an output spectrum of each part in pre-processing of the transmitting part when the original sequence of FIG. 3 is used and the measurement bandwidth is 100 MHz. To be specific, FIGS. 5A to 5C show a case that the 4 times over-sampling is applied in the 100 MHz measurement bandwidth of Table 2. FIG. 5A shows an output spectrum of the variable over-sampling procedure 211 in the transmitting part. FIG. 5B shows an output spectrum of the band-limited filter procedure 212 in the transmitting part. FIG. 5C shows an output spectrum of the digital intermediate frequency procedure 213 in the transmitting part. That is, as shown in Table 2, FIGS. 4A to 5C show that the variable bandwidth is realized by applying the D/A operation speed fixed at 400 MHz and over-sampling varied according to the measurement bandwidth.

As described above, the present invention can maintain the transmitting intermediate frequency with no regard to the measurement bandwidth by realizing the variable bandwidth by fixing the D/A operation speed of the transmitting part and varying over-sampling according to the measurement bandwidth. That is, in FIG. 2, the present invention can maintain the transmitting intermediate frequency at 100 MHz with no regard to the measurement bandwidth by realizing the variable bandwidth by fixing the D/A operation speed at 400 MHz and varying over-sampling according to the measurement bandwidth. Accordingly, the image element can be easily removed after performing frequency up-conversion into a carrier frequency in a Tx RF block 216 of the transmitting part with reference to FIG. 6.

Figure 6:
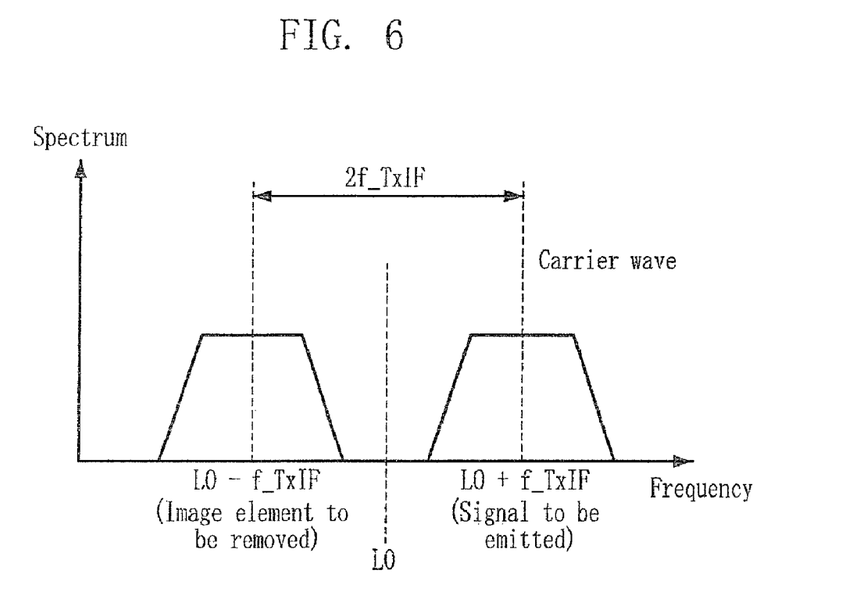
FIG. 6 shows a spectrum when frequency up-conversion into the carrier frequency is performed in a Tx RF block of the transmitting part in accordance with an embodiment of the present invention.

FIG. 6 shows a spectrum when frequency up-conversion into the carrier frequency is performed in the Tx RF block 216 of the transmitting part in accordance with an embodiment of the present invention.

Referring to FIG. 6, since the transmitting intermediate frequency is maintained at 100 MHz with no regard to the measurement bandwidth in the present invention, a gap between the image element and the element to be emitted is 200 MHz in the spectrum after frequency up-conversion into the carrier frequency is performed. Accordingly, the image element can be easily removed in the Tx RF block 216 of the transmitting part.

Differently from the variable bandwidth realizing method of the present invention, when the variable bandwidth is realized by fixing over-sampling at 4 times and varying the D/A operation speed, the transmitting intermediate frequency becomes the same as the measurement bandwidth and a filter bank should be realized for filtering after D/A operation. Also, it is difficult to remove the image element after performing frequency up-conversion into a carrier frequency in case of narrow measurement bandwidth. For example, considering a case that the measurement bandwidth is 5 MHz, since the gap between the element to be emitted and the image element is 10 MHz, it is difficult to remove the image element.

In addition, differently from the present invention, when the variable bandwidth is realized by fixing the D/A operation speed and varying over-sampling, a transmitting intermediate frequency can be differently applied according to the measurement bandwidth. But, in this case, a filter bank is required for filtering after D/A operation. Therefore, when the variable bandwidth is realized by fixing the D/A operation speed and varying over-sampling, it is desirable that the transmitting intermediate frequency is fixed with no regard to the measurement bandwidth, just as in the present invention.

Figure 7A:
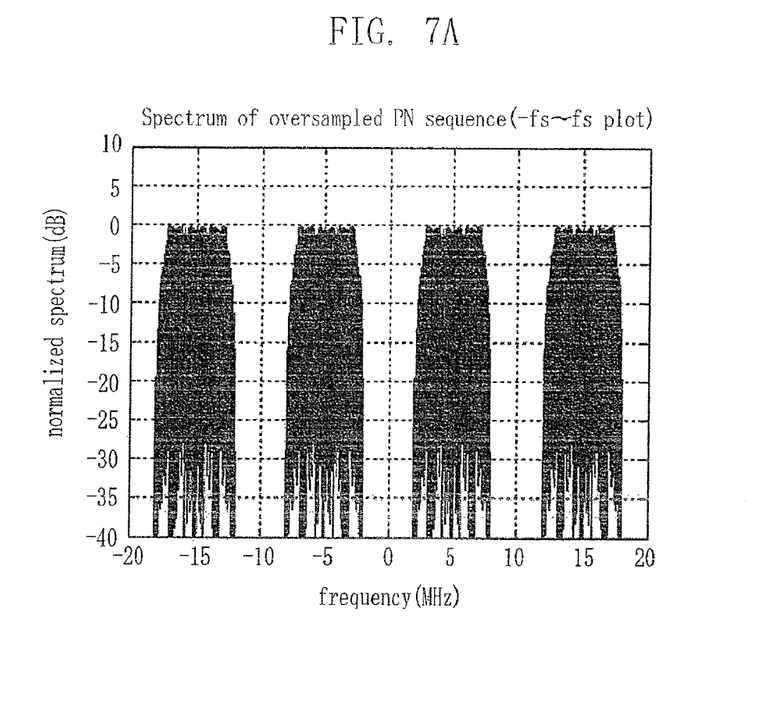
FIG. 7A is a graph showing an output spectrum when the measurement bandwidth is 5 MHz in the receiving part where the present invention is applied.
Figure 7B:
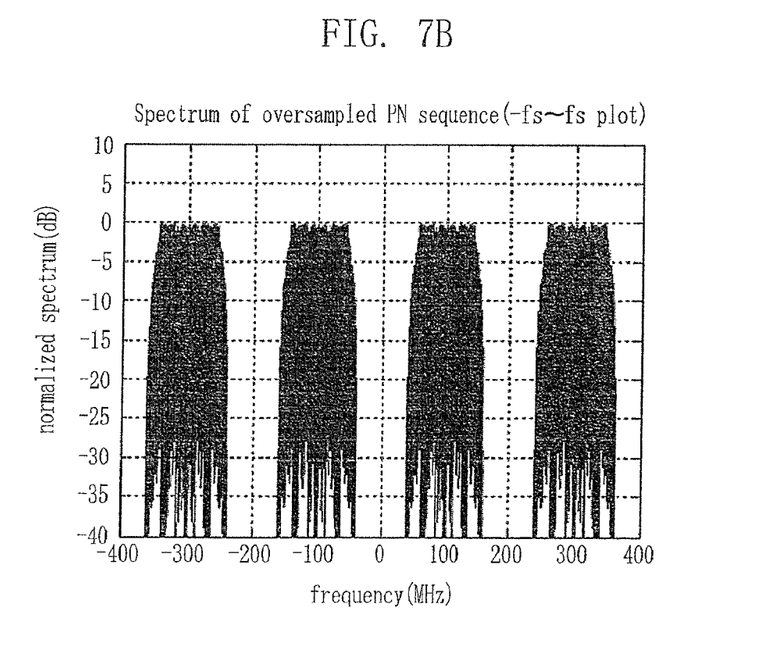
FIG. 7B is a graph showing an output spectrum when the measurement bandwidth is 100 MHz in the receiving part where the present invention is applied.

FIG. 7A is a graph showing an output spectrum when the measurement bandwidth is 5 MHz in the receiving part where the present invention is applied. FIG. 7B is a graph showing an output spectrum when the measurement bandwidth is 100 MHz in the receiving part where the present invention is applied. That is, FIG. 7A shows an output spectrum of the A/D converter 221 in the 5 MHz measurement bandwidth of Table 2 and FIG. 7B shows an output spectrum of the A/D converter 221 in the 100 MHz measurement bandwidth of Table 2.

Referring to Table 2, the receiving part of the present invention varies the receiving intermediate frequency and the A/D operation speed according to the measurement bandwidth. Accordingly, in the receiving part, the memory capacity of the A/D converter 221, which should be larger than a quantity of data acquired when the probing signal is once acquired may be a realistic value. Also, in the wireless channel measurement performed by a plurality of probing signal acquisitions, the receiving part manages efficient operation of the wireless channel measurement apparatus in consideration of a quantity and a storing time of data stored in the storage of the receiving part. For example, a case that the 5 MHz measurement bandwidth, the transmitting antennas of N=8, the receiving antennas of M=8 in FIG. 3, and the DAQ unit having 20 frames are adopted will be described.

Differently from the present invention, if the receiving intermediate frequency and the A/D operation speed are fixed in the receiving part, just as in the transmitting part, a sample is taken at a 400 MHz speed during 3,144,960 µs (=4095×3× 64×20×0.2 µs). In case that the A/D converter 221 is 2 byte resolution per 1 sample, the memory capacity of the A/D converter 221 more than 2.52 Gbyte[=3,144,960 µs×400 sample/ µs×2 byte/sample] is required.

In measuring the wireless channel for 60 minutes, although 40 minutes of 60 minutes is a storing time for the storage 222, the quantity of data becomes 962 Gbyte[=1200 s/3.144960 s×2.52 Gbyte] and the unrealistic capacity of the storage 222 is required.

Meanwhile, when the receiving intermediate frequency and the A/D operation speed are varied according to the measurement bandwidth, just as in the present invention, the memory capacity of the A/D converter 221 requires only 126 Mbyte[=4095×3×64×20×(1/measurement bandwidth)×(4× measurement bandwidth)×2(byte/sample)] with no regard to the measurement bandwidth.

Also, in the band-limited filter 224 of the receiving part, a filter performance normalized as a measurement bandwidth should have the same characteristic with no regard to the measurement bandwidth. Differently from the present invention, when the operation speed of the A/D converter 221 is fixed at 400 MHz, the number of tabs of the band-limited filter 224 increases in case of narrow measurement bandwidth, thereby increasing the operation quantity in the band-limited filter. For example, when it is assumed that the proper number of tabs of the band-limited filter 224 is 256 (=10 ns×64/2.5 ns) in a 100 MHz measurement bandwidth, the number of tabs of the band-limited filter 224 for the same filter performance is 5120 (=200 ns×64/2.5 ns) in case of a 5 MHz measurement bandwidth. Accordingly, as the measurement bandwidth becomes smaller, the operation quantity and time unrealistically increase.

Meanwhile, when the receiving intermediate frequency and the A/D operation speed are varied according to the measurement bandwidth, just as in the present invention, the number of tabs of the band-limited filter 224 in the receiving part is fixed at 256 [=((1/measurement bandwidth)×64)/(1/(4×measurement bandwidth))] with no regard to the measurement bandwidth.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

As described above, the present invention can measure the wireless channel of a plurality of bandwidths by a wireless channel measurement transmitter and receiver. Also, the present invention can easily realize a transmitter by using the same transmitting intermediate frequency with no regard to the bandwidth by fixing the D/A operation speed in the transmitter and creating a variable bandwidth signal by varying over-sampling according to the measurement bandwidth.

Also, the present invention can realize an apparatus considering the realistic capacity of the A/D converter memory and the capacity of the storage by varying the receiving intermediate frequency and the A/D operation speed according to the measurement bandwidth in the receiver. Also, the present invention can maintain the operation quantity of the band-limited filter with no regard to the measurement bandwidth in the receiver.

While the present invention has been described with respect to the specific embodiments, it will be apparent to those skilled in the art that various changes and modifications may be made without departing from the spirit and scope of the invention as defined in the following claims.

What is claimed is:

1. A receiver for measuring a variable bandwidth wireless channel, comprising:
    a real-time processing means for storing measurement data acquired by varying a receiving intermediate frequency and an analog-to-digital (A/D) operation speed according to a measurement bandwidth; and
    a post-processing means for checking a characteristic of the wireless channel from the measurement data;
    wherein the post-processing means has the same filter performance normalized as the measurement bandwidth although the number of tabs of the band-limited filter is fixed with no regard to the measurement bandwidth.

2. A method for measuring a variable bandwidth wireless channel, comprising the steps of:
    storing measurement data acquired by varying a receiving intermediate frequency and an analog-to-digital (A/D) operation speed according to a measurement bandwidth; and
    checking a characteristic of the wireless channel from the measurement data in the receiving means;
    wherein, although the number of tabs of a band-limited filter is fixed with no regard to the measurement bandwidth, a filter performance normalized as the measurement bandwidth is equally maintained, in the step of checking the characteristic of the wireless channel from the measurement data.

* * * * *